United States Patent [19]
Baker et al.

[11] Patent Number: 5,581,797
[45] Date of Patent: Dec. 3, 1996

[54] METHOD AND APPARATUS FOR DISPLAYING HIERARCHICAL INFORMATION OF A LARGE SOFTWARE SYSTEM

[75] Inventors: Marla J. Baker, Brookings, Oreg.; Stephen G. Eick, Naperville, Ill.

[73] Assignee: Lucent Technologies Inc., Murray Hill, N.J.

[21] Appl. No.: 141,306

[22] Filed: Oct. 22, 1993

[51] Int. Cl.⁶ .................................................. G06F 3/14
[52] U.S. Cl. ......................... 395/326; 395/140; 395/500; 395/356
[58] Field of Search .................................. 395/161, 160, 395/159, 157, 140, 152, 700, 425, 497.02, 497.04, 480, 444, 474

[56] References Cited

U.S. PATENT DOCUMENTS

| | | | |
|---|---|---|---|
| 4,860,204 | 8/1989 | Geudron et al. | 395/140 |
| 5,136,690 | 8/1992 | Becker et al. | 395/161 |
| 5,191,646 | 3/1993 | Naito et al. | 395/161 |
| 5,276,789 | 1/1994 | Besaw et al. | 395/140 |
| 5,323,314 | 6/1994 | Baber et al. | 395/155 X |
| 5,339,393 | 8/1994 | Duffy et al. | 395/161 |
| 5,428,554 | 6/1995 | Laskoski | 395/161 X |
| 5,446,838 | 8/1995 | Kimelman | 395/161 |

OTHER PUBLICATIONS

"Tree–Maps: A space–Filled Approach to the Visualization of Heirarchical Information Structures," B. Johnson, B. Schneiderman, Proceedings–Visualization '91, Oct. 22–14 25, 1991–IEEE Computer Society Press, pp. 284–290.

Primary Examiner—Raymond J. Bayerl
Attorney, Agent, or Firm—Jack R. Penrod

[57] ABSTRACT

An interactive method and apparatus for displaying structure, statistics, and characteristics of large software systems, i.e. of more than one million lines of code. This method and apparatus displays important structure and statistics in a manner where the entire software system can be visualized as an entity. The visualization technique is to present similar subdivisions of the code in similar geometric shapes of having a substantially equal reference frames, such as a substantially constant row heights, so relative sizes of the subdivisions can be understood. In addition to the sizes, different shading and coloring modes can be used to display changes, software errors and software fixes. Further, if data of the various releases of a software system are available, the evolution of the system through its releases can be animated to provide a greater understanding of the history of a large software system.

20 Claims, 11 Drawing Sheets

Microfiche Appendix Included
(1 Microfiche, 63 Pages)

METHOD AND APPARATUS FOR DISPLAYING HIERARCHICAL INFORMATION OF A LARGE SOFTWARE SYSTEM

MICROFICHE APPENDIX

A microfiche appendix containing a computer program listing is included. The microfiche appendix is one single sheet of microfilm with 63 frames of computer listing appearing thereon.

1. Field of the Invention

This invention relates to computer systems and more particularly to an apparatus and method for graphically displaying key characteristics of a large software system.

2. Background of the Invention

Large software systems of over one million lines of source code are major developments requiring the industrious efforts of many highly trained specialists over a long period of time. Software systems have an overall architecture, just as a large building has an overall architecture. Within the overall architecture of a large software system are subsystems, directories and files that provide the particular functionality of the system, just as the stories, wings and rooms of a large building provide the functionality of the building. Subsystems, directories and files of a system may also evolve over time as the functionality required of them evolves, just as wings and rooms of a building may be added, removed and renovated as the requirements of a building change. A large building has its original architecture and structure displayed in a series of easily visualized technical illustrations called blueprints. To assist later construction and renovation of a building, the blueprints are revised such that both the original architecture and structure and any later changes to the original architecture and structure are shown in a visually recognizable and readily understandable manner. Unfortunately, a method for displaying the original architecture and structure of a large software system, including the subsystems, directories and files thereof, and all of subsequent changes in a visually recognizable and readily understandable manner does not currently exist.

The known displaying and visualization techniques for small software systems have not been successfully scaled up for use with large software systems. Source code listings of large software systems overwhelm the mind with too much fine grain detail. Flow charts and structure diagrams not only become overloaded with details, but latter changes to the software system may render the original flow, structure and abstractions irrelevant to the current version of the system. Additionally, the emerging displaying and visualization techniques for large systems, such as the tree-map technique presented in the article "Tree-Maps: A Space-Filling Approach to the Visualization of Hierarchical Information Structures" by Johnson and Shneiderman, Proceedings Visualization '91; produce displays that are difficult to understand. The tree-map technique fills a display area with rectangles whose controlled quantity is its area. The result of controlling only area of rectangles is that some rectangles can be long and narrow, some short and wide, and still others approximately square, yet have the same area. This makes visualization of structural details difficult because the viewer must compare areas of numerous rectangles having various lengths and widths to make relative judgments. Thus, there is a need in the art for graphically displaying information and statistics about subsystems, directories and files of a large software system in an understandable manner for use by later software maintenance and development personnel.

It is object of the present invention to provide an apparatus for displaying the architecture and structure of a large software system to enable technical personnel to understand the relationships between its subsystems, directories and files.

It is another object of the invention to provide an apparatus for displaying information and statistics about the changes to the code of a large software system to enable technical personnel to understand the evolution of the functionality of the system its subsystems, directories and files.

It is another object of the present invention to provide a method for displaying the architecture and structure of a large software system to enable technical personnel to understand the relationships between its subsystems, directories, modules and files.

It is another object of the invention to provide a method for displaying information and statistics about the changes to the code of a large software system to assist technical personnel to visualize and understand the evolution of the functionality of the system its subsystems, directories, modules and files.

SUMMARY OF THE INVENTION

Briefly stated in accordance with one aspect of the invention the aforementioned objects are achieved by providing an apparatus for displaying at least one statistic about a hierarchy of entities to which the statistical information applies in a display in a computer system. The apparatus includes a first region in the display which corresponds to a topmost entity of the hierarchy. Contained within the first region are multiple contained regions arranged in at least one row with each row height being substantially the same for all rows. Each contained region corresponds to an entity other than the topmost entity. The area of each of the contained regions represents the statistic for the corresponding entity. Each of the contained regions that is contained in a region corresponds to an entity at the next highest level of the hierarchy. The contained regions immediately contained in a containing region have shapes such that the relative sizes of the immediately contained regions are easily perceived from the display.

In another aspect of the invention the objects are achieved by providing a method for displaying at least one statistic about a hierarchy of entities to which the statistical information applies in a display in a computer system. The method allocates a first region in the display which corresponds to a topmost entity in the hierarchy; and divides the first region into a plurality of contained regions contained in the first region that are arranged in at least one row with each row height being substantially the same for all rows, each contained region corresponding to an entity other than the topmost entity, the area of each of the contained regions representing the statistic for the corresponding entity, each of the contained regions being contained in a region corresponding to an entity at the next highest level of the hierarchy, and the contained regions immediately contained in a containing region having shapes such that the relative sizes of the immediately contained regions are easily perceived from the display.

BRIEF DESCRIPTION OF THE DRAWING

While the specification concludes with the appended claims particularly pointing out and distinctly claiming the subject matter which is regarded as the invention, it is believed that the invention will be better understood from the following description taken in conjunction with the accompanying figures in which:

DETAILED DESCRIPTION

Figure 1:
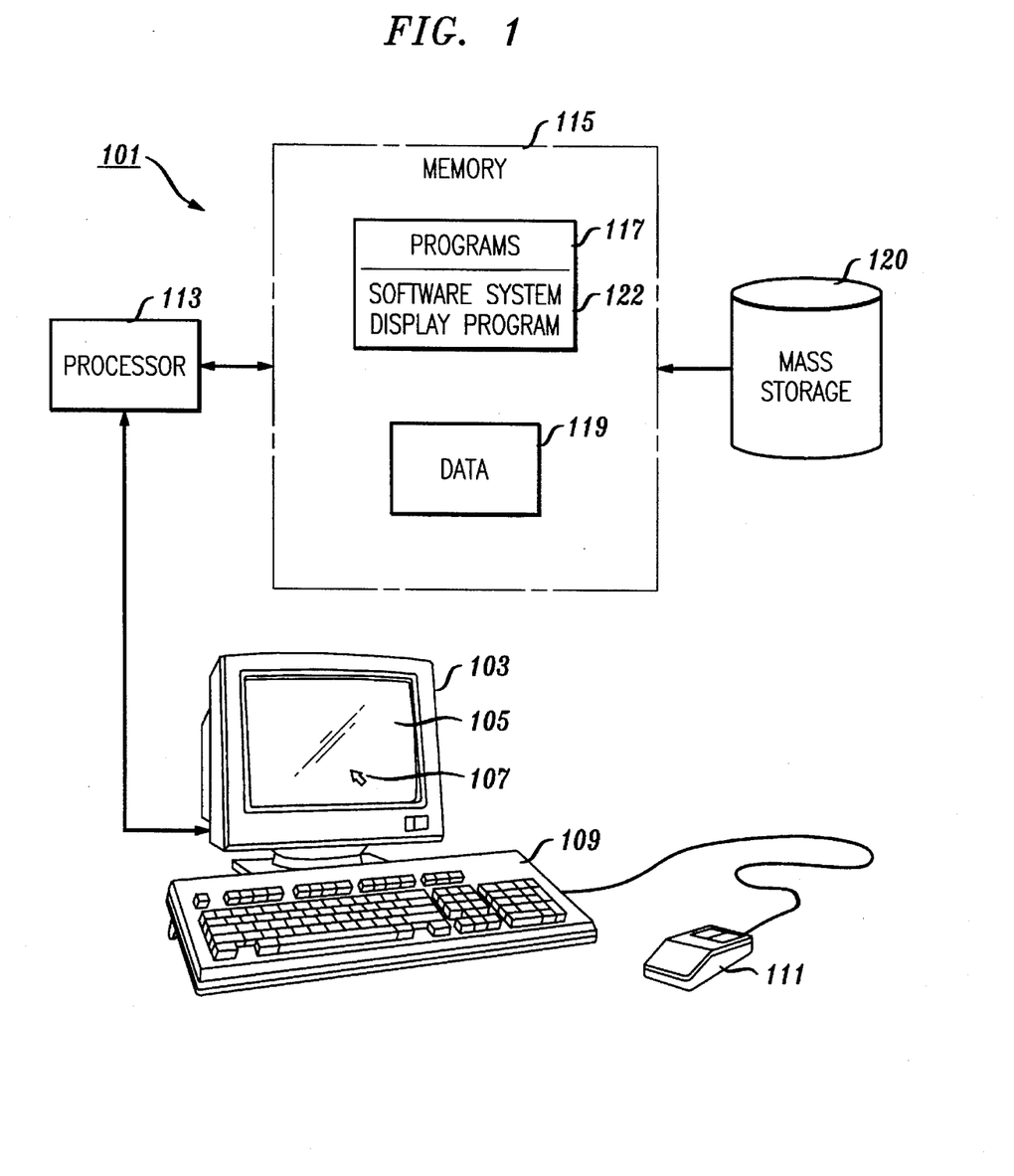
FIG. 1 is a block diagram of an example of a computer system for displaying a hierarchical software system.

Referring now to FIG. 1, a computer system 101 is illustrated in this block diagram. The computer system 101 includes terminal 103, which provides output to and receives input from technical personnel operating the computer system 101, processor 113, which performs the actual operations, memory 115, which contains programs 117 executed by processor 113, and data 119, which contains data regarding a hierarchical software system and may contain the hierarchical software system itself. Computer system 101 also has a mass storage unit 120 for storing large programs and large quantities of data.

In more detail, terminal 103 includes a display screen 105, upon which processor 113 displays information for the operator. Display screen 105 also includes a pointer 107, which specifies a location in display 105 and may be moved under control of either keyboard 109 or mouse 111. The operator controls the operation of computer system 101 by inputs from keyboard 109 and/or mouse 111. Processor 113 may be any kind of processor, from a personal computer through a super-computer. Memory 115 may include random-access memory and read only memory for program and data storage. Mass storage unit 120 may include a magnetic disk, an optical disk, or even a remotely-located data base.

When employing computer system 101 to process and display information, i.e. statistics, about a large hierarchical software system, the operator inputs one or more commands using keyboard 109 or mouse 111; processor 113 executes programs 117 as required to perform the command or commands and displays the results on display screen 105. The operator can then use keyboard 109 and/or mouse 111 to issue one or more commands in order to examine or process the results in even greater detail.

Figure 2:
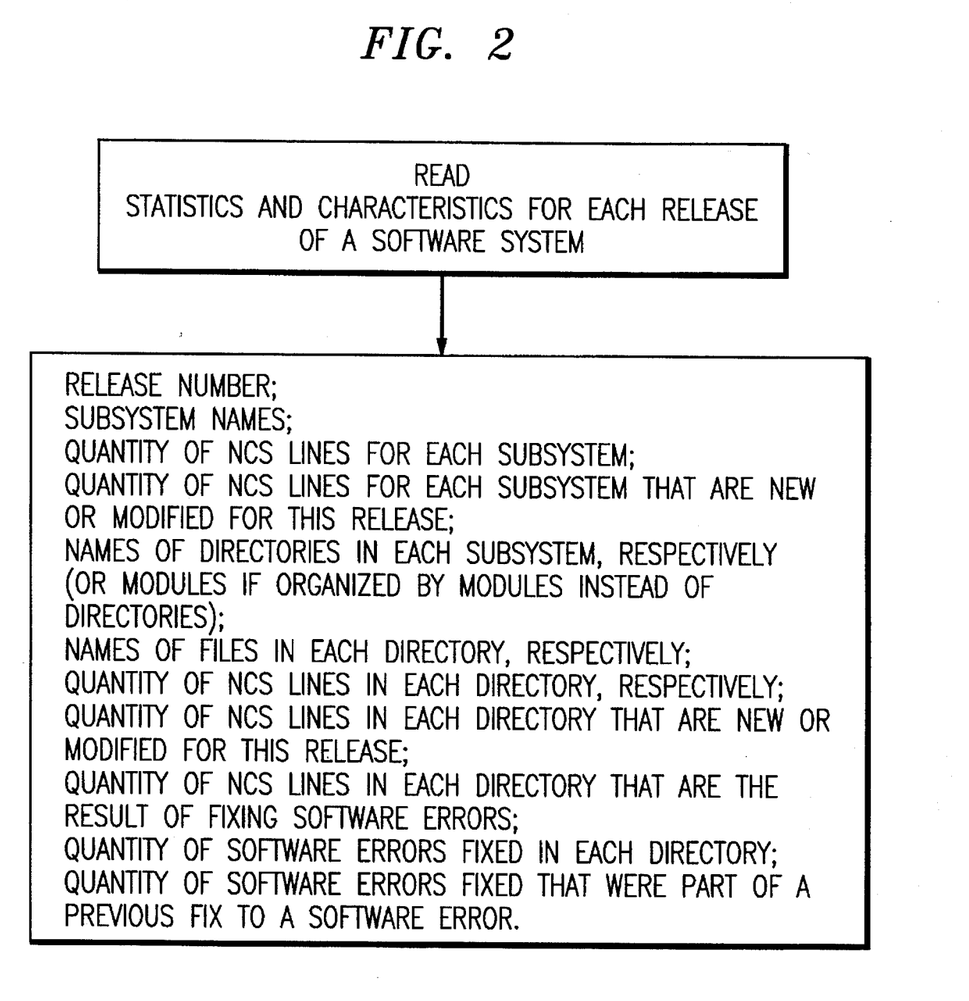
FIG. 2 is a flow diagram of a read key characteristics portion of the display apparatus and method.

Referring now to FIG. 2, after a name of a software system has been typed on keyboard 109 or selected by mouse 111 in order to start the display of the characteristics and structure of the selected software system. Statistics relating to the key characteristics are associated with the selected software system and these statistics are read into memory 115, if not already there, and stored there for use by the displaying program 122 according to the present invention. Processor 113 then processes the software system display program 122 to provide displays to help the operator more readily understand the characteristics and structure of the software system in a broad context. A listing of a display program 122 in C programming language is given in Microfiche Appendix A.

Processor 113 reads in the number of non-commentary source code lines (NCS lines) for a release of the software system, such as the most current release, as well as the number of NCS lines in one or more previous releases. The number of NCS lines serves as a baseline for many of the displays, as will be explained below. Those in the art will recognize that other baseline units, such as amount of source code, could be used instead of NCS lines and such minor modifications are deemed to be within the scope of the present invention.

Referring to FIG. 2, the subsystem characteristics and statistics that are read in by processor 113 are shown. The name of each subsystem is read along with its release designation and number of NCS lines. Additionally for each subsystem of a release designation, a number of new NCS lines, a name of each directory within its respective subsystem, a name of each file within its respective directory, a number of NCS lines within each directory, and a number of new NCS lines for each directory file are read. Further, the number of software errors corrections (bug fixes) and the number of software errors corrections to previous software corrections for each directory are also read. This read of statistics into memory 115 allows rapid access to these statistics so the operator can use the interactive and/or animation features of the present invention without the delays caused by constantly accessing data from a slower device such as a disk drive.

Figure 3A:
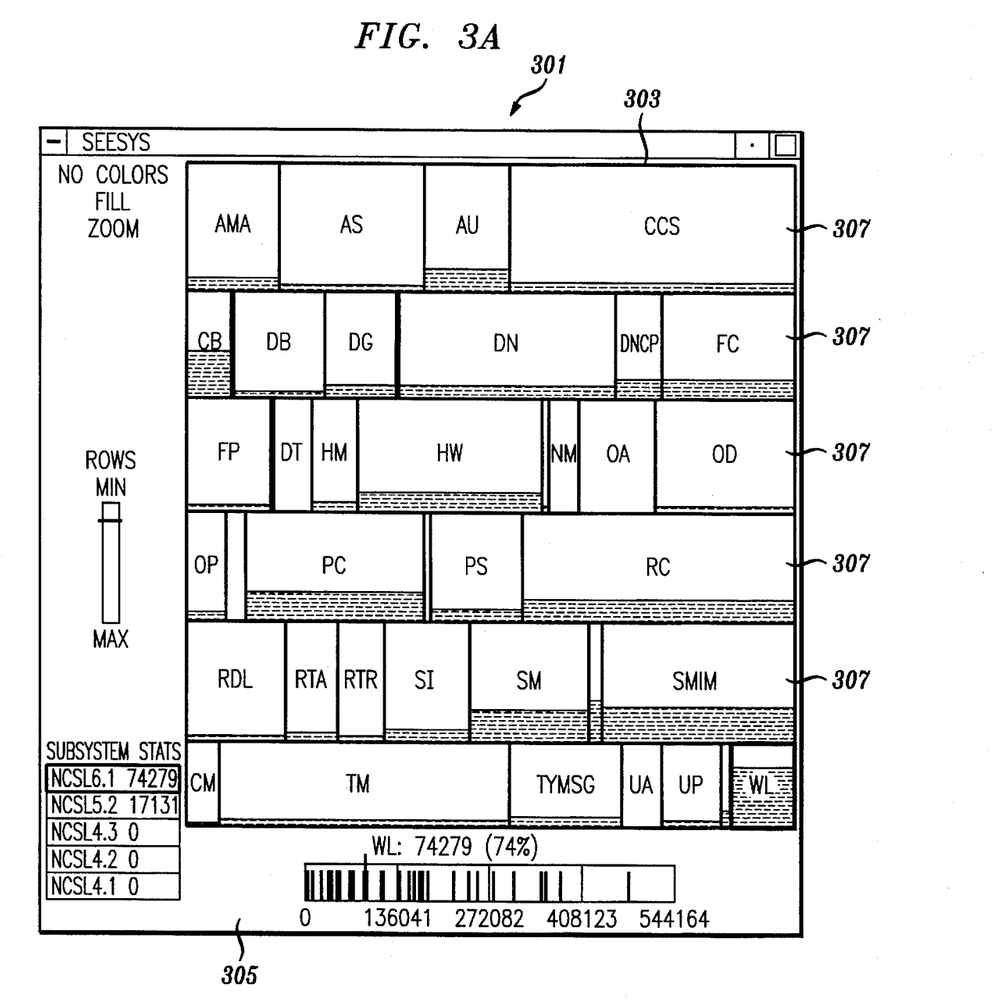
FIG. 3A is a pictorial view of a display showing subsystem relative size and proportion of newly developed code in multiple rows.

Referring now to FIG. 3A, the displaying of the statistics and characteristics of a large hierarchical software system will now be explained. First, a system display space 303 is defined on the display screen 301 in which the subsystem statistics and characteristics are displayed. Display screen 301 also has a control and indicator space 305 to the left and below of display space 303. Display space 303 is an interactive window which can be sized in the x and y directions under pointer and mouse control. The display space 303 is rectangular, which is preferred because rectangular representation are a form that is easy to visually understand, although other geometric shapes such as an ellipse or a circle could be used and are deemed to be within the scope of the present invention.

Display space 303 is divided into a number of geometric shapes 307, with the size, i.e. the area, of each geometric shape representing the number of NCS lines in its respective subsystem. The geometric shapes 307 are rectangles, but other geometric shapes such as triangles, trapezoids, etc. could also be used. Especially if a circular display space is used, concentric adjacent rings could be used instead of rows and sections of such rings could be used as the geometric shapes representing each subsystem.

Display space 303 is divided into one or more rows of geometric shapes 307. Each row is substantially the same extent in the y direction, i.e. height, as the other row or rows if any. If there is only one row, as in FIG. 3B, then the geometric shapes all have the same extent in the y-direction. This makes for very high very narrow geometric shapes that are harder to visually interpret size relationships between spaces, but having a uniform height. Because very high very narrow geometric shapes are harder to visually interpret, an interactive row control slide area 309 is provided. Dragging the indicator bar from MIN to MAX with pointer 107 and mouse 111 increases the number of rows in the display area 303 from 1 to the number of subsystems in the software system as a maximum. The operator may choose the number of rows that are easiest for he or she to interpret. Six rows are shown in FIG. 3B.

The subsystems are alphabetically sequenced left to right in descending alphabetical order along each row. Since the order of occurrence is determined by name and not size, the method of displaying each geometric shape 307 also includes a solution for inconvenient subsystem sizes, such as a very large file occurring at the end of a row that might occur. The method takes the number of subsystems, Subs, and divides it by the number of rows, Rows, and takes the NCS lines, NCSL, of the subsystem and divides that by the number of rows. The display program 122 then allocates subsystems to be displayed in the first row in alphabetical order. The display program 122 tentatively allocates the quotient of (Subs/Rows) as the number of subsystems on the first row. Display program 122 then adds up the number of NCS lines of the subsystems allocated for the first row and compares that to the quotient of (NCSL)/(Rows). If the number of NCS lines of the tentatively allocated subsystems is less than the displaying system may allocate an additional subsystem to this row. Once the allocation of the first row is made, the height of the row is adjusted such that its area corresponds to the fraction of the total area of display space 303 as the fraction of NCS lines of the subsystems on the first row corresponds to the total NCS lines of all subsystems. The method process subsequent rows in the same manner. Since the area of each row is adjusted to its corresponding portion of the display space 303, there will always be room for the remaining subsystems. Thus, the solution provided by the present invention is to vary the height of the rows somewhat to either provide more area within a row for all the subsystems in order to get that last file on the row, or less area and force the last file off the end of a row onto the beginning of the next row. This row height self adjustment makes the use of uneven row lengths or broken-in-the-middle geometric shapes for filling rows in the display space 303 unnecessary. This solution provides one hundred per cent usage of the display space 303.

As mentioned before, the area of each geometric shape 307 is the same proportion to the entire display space 303 as the number of NCS lines of its corresponding subsystem has to the total number of NCS lines in the entire software system. Some of the geometric shapes 307 are shaded. In FIG. 3A, this shading represents the proportion of newly written NCS line in the subsystem. Thus, two statistics are shown in FIG. 3A, the relative sizes of each subsystem and the amount of new code relative to the size of each subsystem. The single row display 303A, shown in FIG. 3B, is useful for showing the amount of new code in each subsystem at the expense of ease of interpretation with respect to the relative sizes of the subsystems. Lack of new code in a subsystem might be an indication of the next place to add new functionality.

Figure 3B:
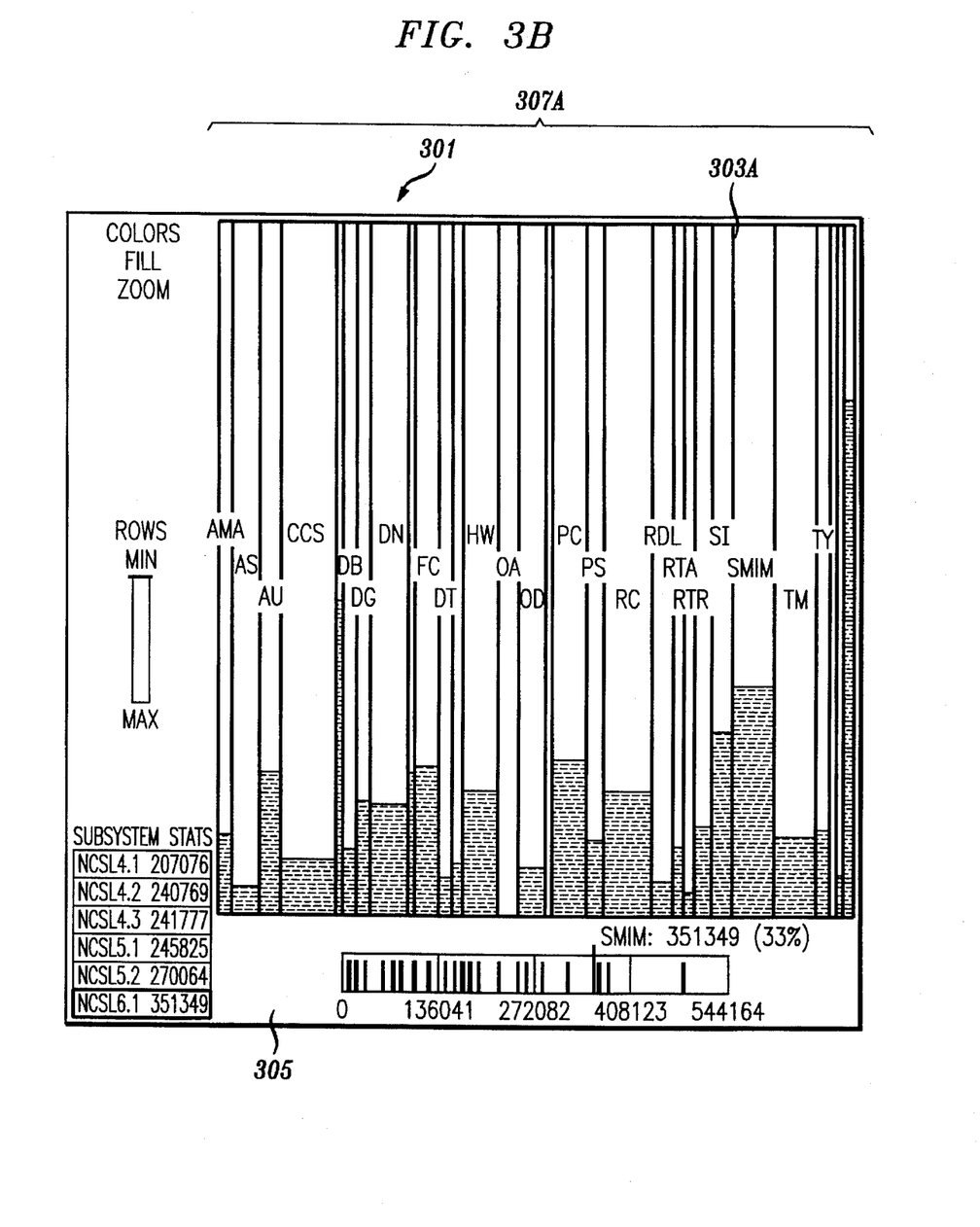
FIG. 3B is a pictorial view of a display showing the same information as FIG. 3A but in a single row.

In FIG. 3B, the geometric shapes 307A have shadings that represent the amount of non-new NCS lines with a gray shade. This shading is varied to different shades of gray to indicate the sizes of the respective subsystems.

Figure 4:
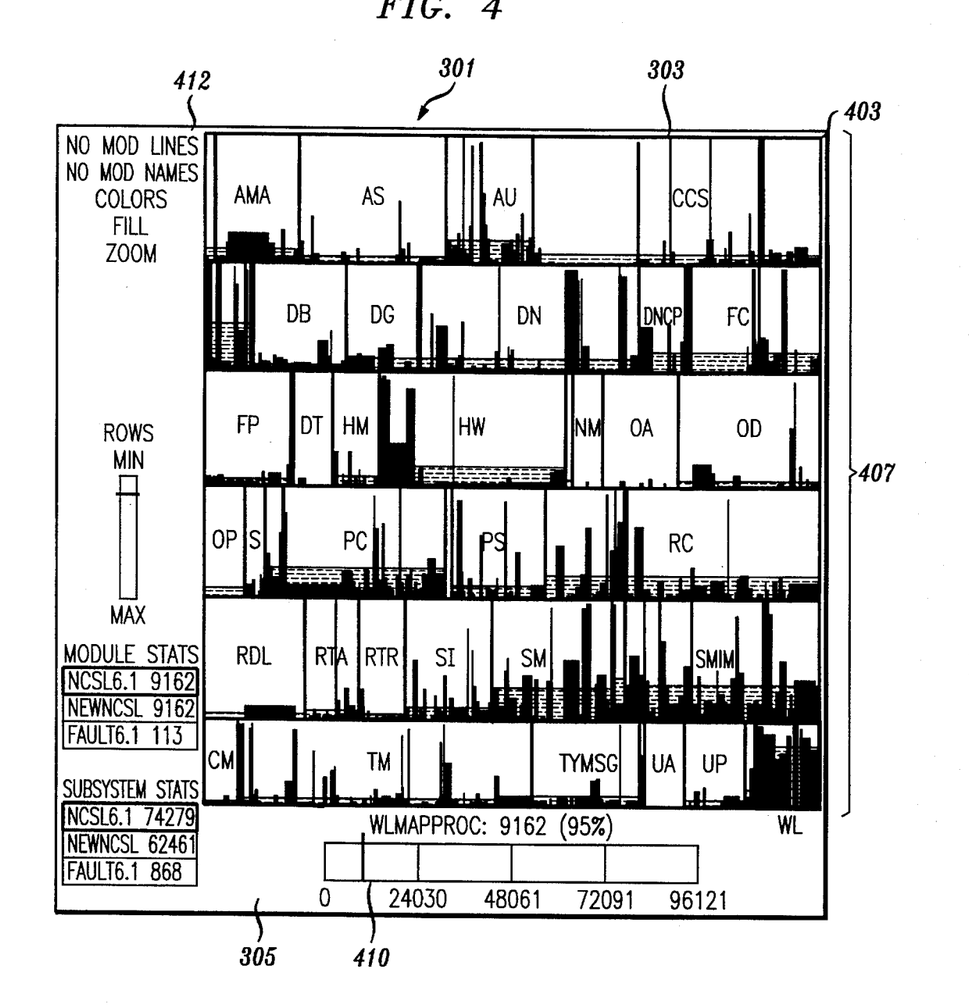
FIG. 4 is a pictorial view of a display showing subsystem relative size, proportion of newly developed code, and directory details of each subsystem in a preferred embodiment.

Referring now to FIG. 4, further details about the software system can be displayed. Display space 403 is substantially the same as display space 303 except that each geometric shape 407 representing a subsystem also has the directories of its corresponding subsystem displayed therein. Each of the directories are represented by a geometric shape whose size, i.e. area, has the same ratio to the area of its subsystem geometric shape 407 as the number of NCS lines of the directory has to the number of NCS lines of its respective subsystem. The directories are arranged in alphabetical order within their respective subsystems. Statistics and characteristics for each directory are also displayed. Often the statistics and characteristics as well as the directory names are not readable in the display 403. For that reason, control space 405 has an interactive information region 410 which is logically linked to the location of the pointer 107. Information region 410 gives the size in NCS lines of the subsystem where the pointer 107 is located. This information is given graphically by a position of an indicator on a slider and by a numerical presentation in the information region 410. Also, information region 410 indicates in an alphanumeric presentation the name of the subsystem in which the pointer 107 is located. As seen in FIG. 4 control space 405 has a Zoom interactive region 412, where if the pointer 107 highlights a subsystem such as subsystem wl, is placed on Zoom region 412 and the zoom feature selected by mouse 111 the display program causes a window to open up in the foreground from display space 403.

Figure 5:
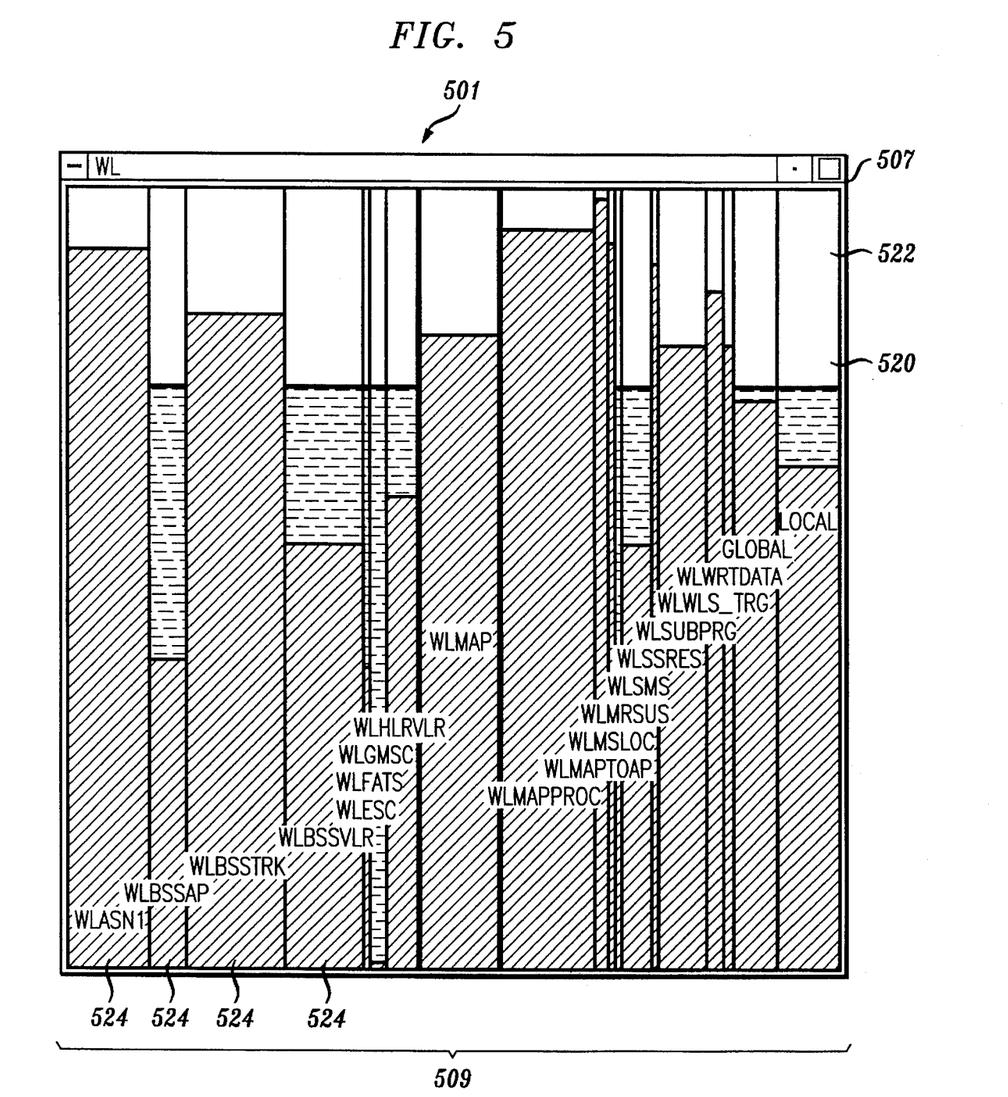
FIG. 5 is a pictorial view of a single subsystem from FIG. 4, enlarged to fill a display screen.

Referring now to FIG. 5, window 501 of a selected subsystem, subsystem wl, is shown. In this embodiment the geometric shape 507 representing the subsystem wl is a rectangle. The geometric shape 507 is divided into rectangles 509 that all have the same extent in the y-direction. The relative size of each directory rectangle 509, therefore, depends on its extent in the x-direction. The name of each directory is approximately centered in the x-direction in its respective rectangle, but may extend beyond the bounds thereof if there is space available in adjacent directory rectangles. To prevent confusion, the centered names of the directories are arranged in a diagonal sequence proceeding in the positive x and y directions.

Three types of shading are displayed in window 501. The light gray 520 and the black 522 provide a background which represents the percentage of new NCS lines of code (light gray) and the percentage of pre-existing NCS lines of code (black) of the overall subsystem wl represented by geometric shape 507. The medium gray 524 shading that is in the foreground of window 501 represents the percentage of new NCS lines in each respective directory 509. Thus, in window 501, the percentage of new NCS lines in a selected subsystem, the relative sizes of the directories that make up the subsystem, and the amount of revised NCS lines in each directory of the subsystem. All in a manner that is easy to make visual comparisons.

It is possible to zoom open more than one window in the foreground of display 301. To help the operator with multiple windows, each window is logically linked by the location of the pointer 107 to information region 410 such that the numeric and alphanumeric regions will display the subsystem the pointer 107 is located in, even in a zoomed window of the subsystem. When the operator is finished with a window, such as window 501, it may be closed upon typing an appropriate command on keyboard 109 or similar actuating command by mouse 111.

Figure 6:
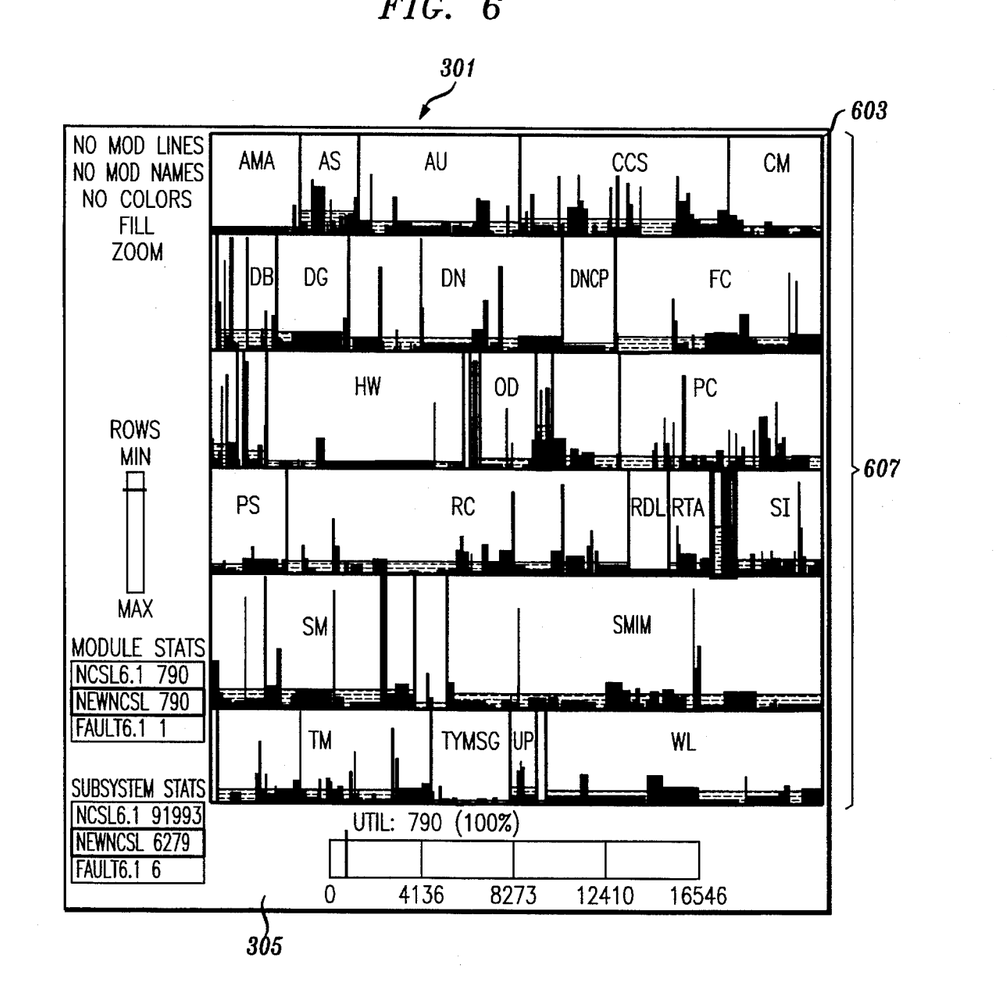
FIG. 6 is a pictorial view of a display showing subsystem sizes relative to new NCS lines and software error fixes in each subsystem in a preferred embodiment.

Referring now to FIG. 6, display of another important statistic will be described. Display space 603 is similar to display 403 in FIG. 4 in that both have geometric shapes that represent relative sizes of the subsystems of the current release and the current directories of those subsystems. In display space 603, however, the size of each geometric shape 607 represents the ratio of the number of new NCS lines of the subsystem to the number of new NCS lines of the software system and the size of each directory represents the number of new NCS lines of its respective subsystem. Further, the shading within each geometric shape 607 represents the percentage of new NCS lines in each subsystem that are included to fix software errors (bugs) in one shade of gray and the percentage of new NCS lines in each directory that are included to fix a software error or errors in a different shade of gray. Thus, display space 603 indicates the subsystems and the directories where the developments to remedy known software errors were located before the displayed release. Also shown will be the areas where new developments to add functionality not fix errors occurred because those geometric shapes 607 will be large in size but slight in shading.

Figure 7:
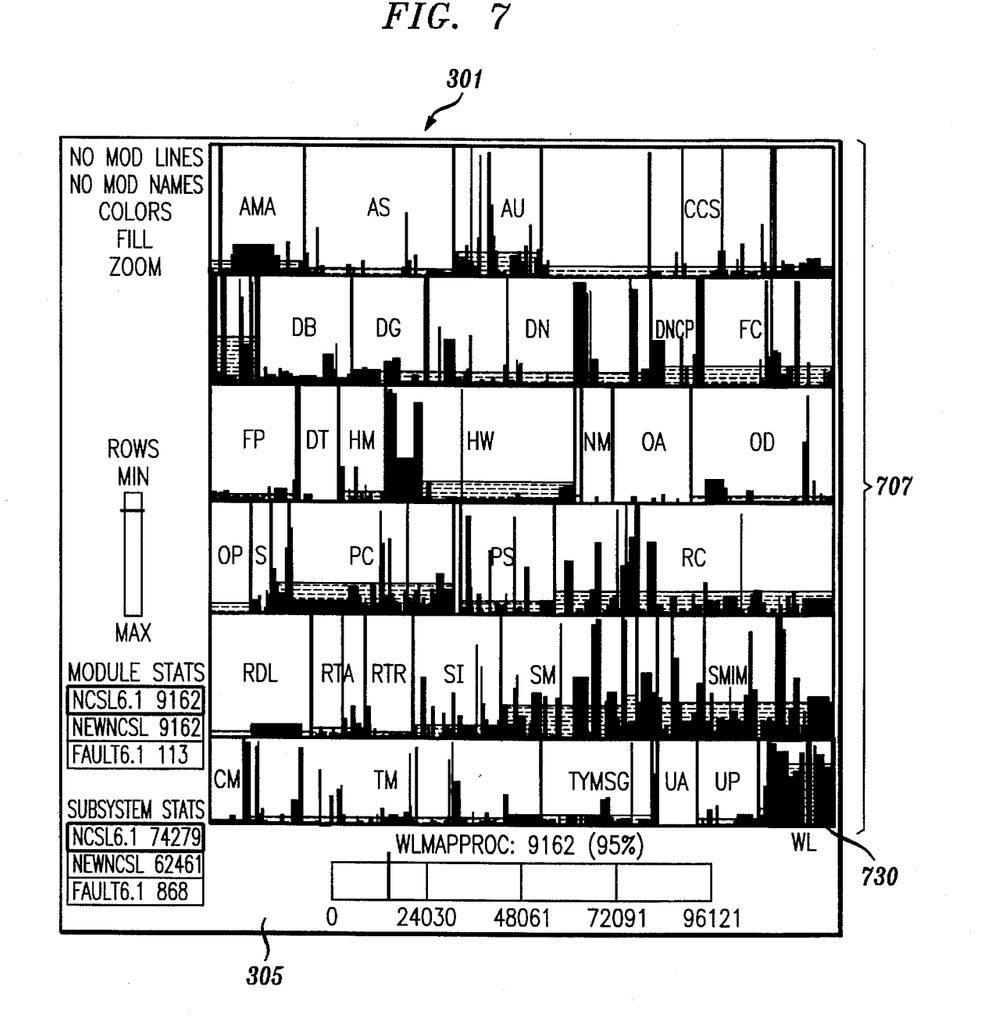
FIG. 7 is a pictorial view of a display showing subsystem sizes relative to new NCS lines for software error fixes and the number of software error fixes required to fix errors in previous software fixes.

FIG. 7 is an even more specialized display of NCS line changes to fix software errors. In FIG. 7, the size of each geometric shape 707 represents the number of software errors found and fixed in the corresponding subsystem of the latest software system release. The directories are likewise sized according to the number of software errors found and fixed by the latest release. The shading in FIG. 7 represents the percentage of software error fixes that were made to previous software error fixes. A geometric shape 707 with a lot of fixes-on-fixes, for example subsystem 730, indicates a troublesome directory or subsystem, which might be a very good candidate for complete restructuring and rewriting.

Figure 8:
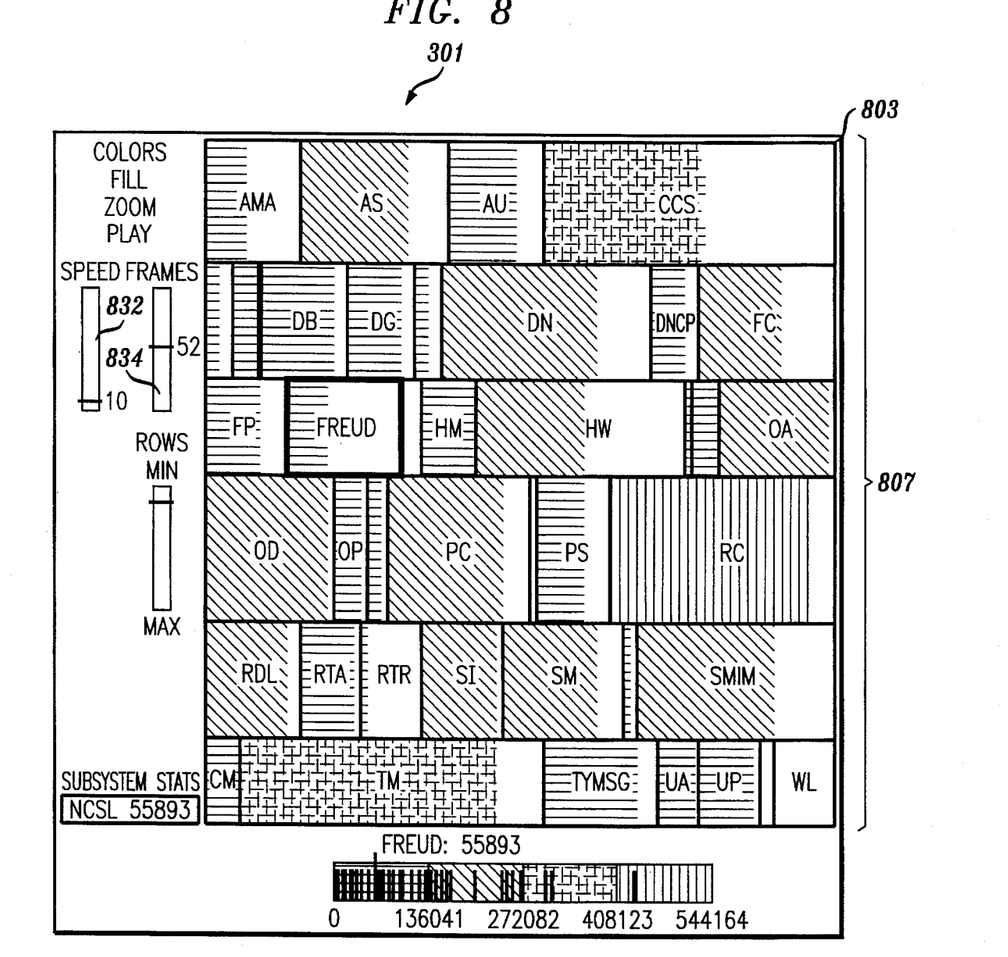
FIGS. 8, 9 and 10 are pictorial views of a display screen showing the changes in subsystem sizes with respect to time in a preferred embodiment.
Figure 9:
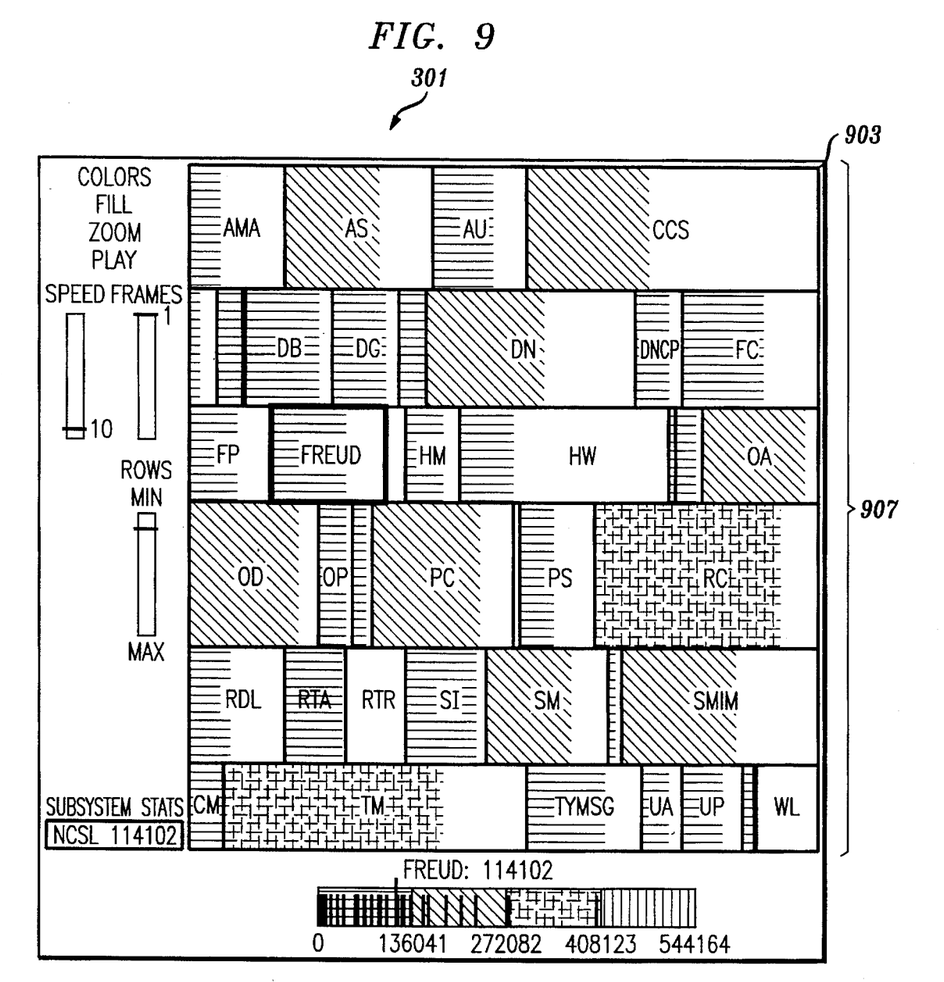
Figure 10:
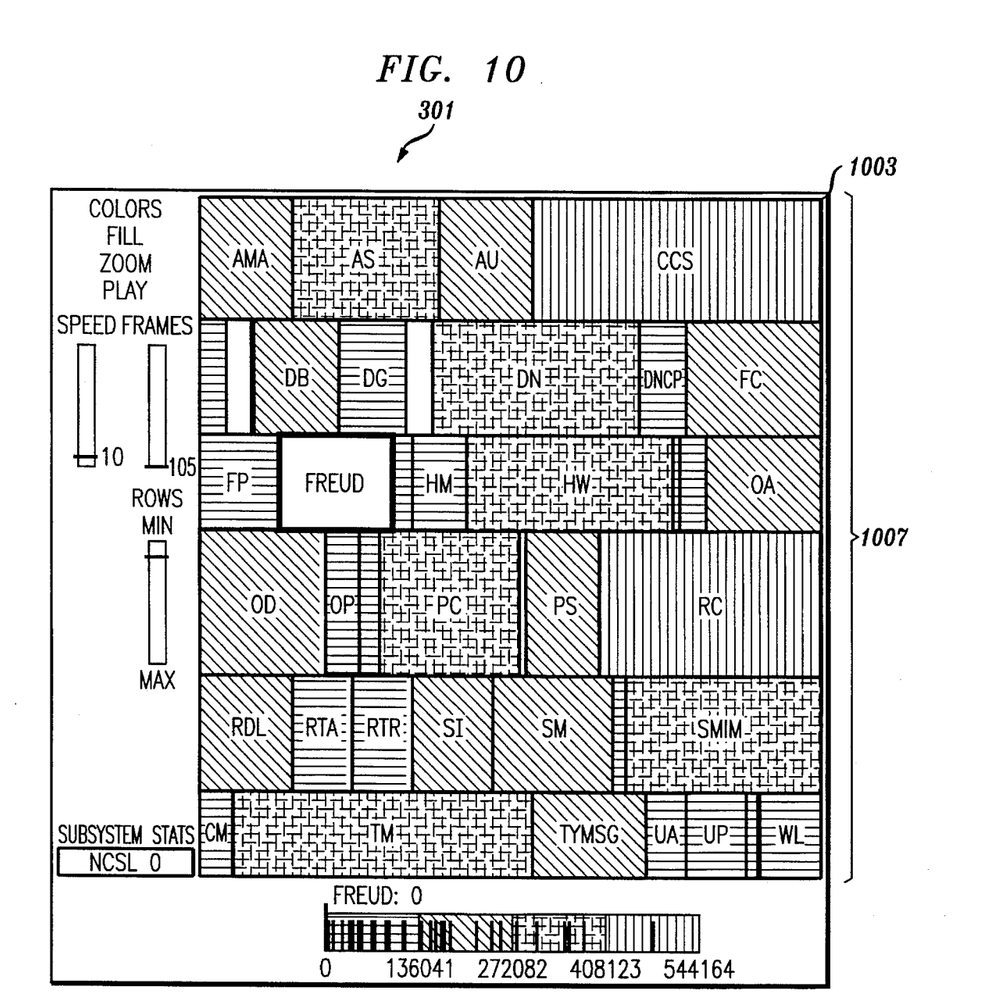

Referring now to FIGS. 8, 9, and 10, the method of visualizing evolution of a software system over two or more releases will be explained. Processor 113 reads through all of the subsystems names and statistics for all of the releases that are to be part of the display. In doing so, processor 113 builds in memory system 115 a list of each subsystem that ever existed and the maximum size of each subsystem in any of the software system releases under consideration. Once this data is accumulated, then display spaces 803, 903 and 1003 (which are time sequences on display screen 301) show rows filled with rectangles 807, 907, and 1007 representing every subsystem that ever existed in the software system and sized with respect to the maximum number of NCS lines that each subsystem ever had. Since these statistics are essentially constants, display spaces 803, 903 and 1003 have the same subsystems and the same subsystem rectangle sizes.

The evolution of the software system is shown by shading size variations within the rectangles 807, 907, and 1007 representing the maximum sizes of subsystems. For each subsystem, the shading represents the size of the subsystem in one of the software releases relative to the subsystem's maximum size.

Display space 803 of FIG. 8 shows the shading of rectangles 807 for the earliest release of the software system. Display space 1003 of FIG. 10 shows the shading of rectangles 1007 for a later release of the software system at a later time. An interactive speed slider 832 allows the operator under mouse control to select the amount of time between the display in the display space 803 and the display in the display space 1003. Alternatively, a frame slider 834 allows the operator via control by pointer 107 and mouse 111 to select any display between the first, shown in FIG. 8, and the one hundred fifth, shown in FIG. 10.

FIG. 9 shows a display that is intermediate between the earliest release represented by FIG. 8 and the current release represented by FIG. 10. FIG. 9 may represent an actual release of software in-between the earliest and the current releases or it may represent an interpolation of code growth between two releases. The purpose of such interpolation is to smooth the animation provided to the operator in those instances where display of actual release data is not sufficient to provide a smooth animated display of software subsystem evolution.

Thus, it will now be understood that there has been disclosed an apparatus and method for displaying a software system such that its statistics and characteristics may be visually interpreted. While the invention has been particularly illustrated and described with reference to preferred embodiments thereof, it will be understood by those skilled in the art that various changes in form, details, and applications may be made therein. For example coloring could be used instead of the gray shadings in FIGS. 3A through 10. Further, other statistics than NCS lines and bugs may be displayed. In fact, this display would apply to statistics of other large systems other than software systems to provide visualization and understanding of the system. It is accordingly intended that the appended claims shall cover all such changes in form, details and applications which do not depart from the true spirit and scope of the invention.

What is claimed and desired to be secured by Letters Patent of the United States is:

1. Apparatus for displaying at least one statistic about a hierarchy of entities to which the statistical information applies on a display screen of a computer system, the apparatus comprising:

a first two dimensional area of the display screen, said first two dimensional area corresponding to a topmost entity in the hierarchy; and a plurality of contained two dimensional areas contained in the first two dimensional area, said plurality of contained two dimensional areas arranged in at least three rows with each row height being approximately the same for all rows, each contained two dimensional area corresponding to an entity other than the topmost entity, the area of each of the contained two dimensional areas representing the statistic for the corresponding entity, each of the contained two dimensional areas being contained in a two dimensional area corresponding to an entity at the next highest level of the hierarchy, and the contained two dimensional areas immediately contained in a containing two dimensional area having shapes such that the relative sizes of the immediately contained two dimensional areas are easily perceived from the display.

2. The apparatus set forth in claim 1 wherein:

the apparatus displays another statistic which applies to the entities; and each of the contained two dimensional areas corresponding to entities at a given level of the hierarchy is visibly divided into sub-areas according to a value of the other statistic for the entity to which the two dimensional area corresponds.

3. The apparatus set forth in claim 2 wherein:

all of the two dimensional areas belong to the same class of polygon.

4. The apparatus set forth in claim 3 wherein:

the class of polygon is the rectangle.

5. The apparatus set forth in claim 4 wherein:

each contained two dimensional area has a designation, respectively; and each designation at least partially is positioned within the two dimensional area that corresponds to its respective entity.

6. The apparatus set forth in claim 1, further comprising:

a second two dimensional area in the display which contains an interactive control two dimensional area for adjusting the number of rows into which said first two dimensional area is divided.

7. The apparatus set forth in claim 1, further comprising:

means for adjusting a height of each row to keep each row height substantially the same and yet fill each row with an integer number of geometric shapes.

8. The apparatus as set forth in claim 1, wherein:

said first two dimensional area is responsive to a click-and-drag operation of a mouse to change its length and width; and said contained two dimensional areas are adjusted in rows to the new length and width of said first two dimensional area.

9. The apparatus as set forth in claim 8, wherein the number of said plurality of rows is adjustable by user input.

10. A method for displaying at least one statistic about a hierarchy of entities to which the statistical information applies on a display screen of a computer system, the method comprising the steps of:

allocating a first two dimensional area of the display screen which corresponds to a topmost entity in the hierarchy;

visually defining said first two dimensional area; and dividing the first two dimensional area into a plurality of contained two dimensional areas contained in the first two dimensional area that are arranged in at least three rows with each row height being approximately the same for all rows, each contained two dimensional area corresponding to an entity other than the topmost entity, the area of each of the contained two dimensional areas representing the statistic for the corresponding entity, each of the contained two dimensional areas being contained in a two dimensional area corresponding to an entity at the next highest level of the hierarchy, and the contained two dimensional areas immediately contained in a containing two dimensional area having shapes such that the relative sizes of the immediately contained two dimensional areas are easily perceived from the display.

11. The method set forth in claim 10, further comprising the steps of:

determining a designation for each contained entity, respectively; and displaying each designation with a center of each designation located within the two dimensional area of the display screen corresponding to its contained entity, respectively.

12. A method for use with a computer having a memory and a display screen for displaying information of a software system having a plurality of subsystems, comprising the steps of:

determining a total amount of source code of the software system;

determining for each subsystem of the plurality of subsystems a respective amount of source code;

defining a primary two dimensional area of the display screen;

dividing the primary two dimensional area into a plurality of rectangular secondary two dimensional areas with each rectangular secondary two dimensional area representing a respective subsystem of the plurality of subsystems;

sizing each rectangular secondary two dimensional area such that each of the rectangular secondary two dimensional areas representing a subsystem has a first dimension which is approximately the same as all of the other rectangular secondary two dimensional areas representing subsystems and an area that is the same proportion with respect to the primary two dimensional area of the display screen as the amount of source code in its respective subsystem is to the total amount of source code of the software system.

13. The method set forth in claim 12, further comprising the steps of:

determining a name for each subsystem, respectively; and displaying at least part of each name within the rectangular secondary two dimensional area that represents its respective subsystem.

14. The method set forth in claim 13, further comprising the steps of:

determining for each subsystem a ratio of the amount of source code that has been revised to the total amount of source code and a ratio of the amount of source code that has not been revised to the total amount of source code; and displaying in each rectangular secondary two dimensional area a first colored two dimensional area proportional to the size of its respective two dimensional area as the ratio of the amount of source code that has been revised is to the total amount of source code, and a second colored two dimensional area proportional to the size of its respective two dimensional area as the ratio of the amount of source code that has not been revised to the total amount of source code.

15. The method set forth in claim 13, further comprising the steps of:

determining for each subsystem a ratio of the amount of source code that has been revised to the total amount of source code and a ratio of the amount of source code that has not been revised to the total amount of source code; and displaying in each rectangular two dimensional area a first shaded two dimensional area proportional to the size of its respective two dimensional area as the ratio of the amount of source code that has been revised is to the total amount of source code, and a second shaded two dimensional area proportional to the size of its respective two dimensional area as the ratio of the amount of source code that has not been revised to the total amount of source code.

16. A method for displaying information of a software system having a plurality of releases and a plurality of subsystems, comprising the steps of:

determining for each subsystem of the plurality of subsystems a respective maximum amount of source code for any release of said plurality of releases;

determining a total maximum amount of source code of the software system by totaling said subsystem maximum amounts of source code;

dividing a display into a plurality of rectangular two dimensional areas with each rectangular two dimensional area representing a respective subsystem maximum amount of source code;

sizing each rectangular two dimensional area such that each of the rectangular two dimensional areas representing a subsystem has a first dimension which is substantially the same as all of the other rectangular two dimensional areas representing subsystems and an area that is the same proportion with respect to the display as the maximum amount of source code in its respective subsystem is to the total maximum amount of source code of the software system.

17. The method set forth in claim 16, further comprising the steps of:

displaying for each release of the software system within each rectangle a shading that represents the ratio of the amount of source code in the displayed release to the maximum amount of source code for the respective subsystem; and sequentially displaying said rectangles and said shadings for each release of the software system at a rate such that changes in the relative sizes of the shadings are easily perceived from the display.

18. The method set forth in claim 16, further comprising the steps of:

displaying for each release of the software system within each rectangle a colored area that represents the ratio of the amount of source code in the displayed release to the maximum amount of source code for the respective subsystem; and sequentially displaying said rectangles and said colored areas for each release of the software system at a rate such that changes in the relative sizes of the colored areas are easily perceived from the display.

19. The method set forth in claim 18, further comprising the steps of:

displaying an intermediate size of each colored area that changes size from one release to another release to animate the changes in the relative sizes of the colored areas to aid perception of the evolution of the software system.

20. The method according to claim 19, further comprising the step of:

adjusting the rate of animation according to a user selection.

* * * * *